US008601757B2

(12) United States Patent
Jaster et al.

(10) Patent No.: US 8,601,757 B2
(45) Date of Patent: Dec. 10, 2013

(54) THERMALLY INSULATING FENESTRATION DEVICES AND METHODS

(75) Inventors: Paul August Jaster, Carlsbad, CA (US); Keith Robert Kopitzke, Fallbrook, CA (US); David James Wilson, Newport Beach, CA (US); David Windsor Rillie, San Marcos, CA (US)

(73) Assignee: Solatube International, Inc., Vista, CA (US)

( * ) Notice: Subject to any disclaimer, the term of this patent is extended or adjusted under 35 U.S.C. 154(b) by 48 days.

(21) Appl. No.: 12/789,367

(22) Filed: May 27, 2010

(65) Prior Publication Data

US 2011/0289869 A1 Dec. 1, 2011

(51) Int. Cl.
*E04D 13/03* (2006.01)
*E04B 7/18* (2006.01)
*G02B 17/00* (2006.01)

(52) U.S. Cl.
USPC ............ 52/200; 52/204.5; 359/592; 359/597; 362/1; 362/147; 362/290

(58) Field of Classification Search
USPC .............. 52/200, 171.1, 204.5; 359/591, 592, 359/593, 595, 596, 597, 598, 599; 362/1, 2, 362/147, 290
See application file for complete search history.

(56) References Cited

U.S. PATENT DOCUMENTS 668,404 A 2/1901 Hanneborg
2,121,777 A * 6/1938 Bailey et al. ................. 52/309.3
2,125,410 A * 8/1938 West ............................... 52/308
2,828,734 A 11/1958 Boyd
2,858,734 A 11/1958 Boyd
3,006,019 A * 10/1961 Deaton ........................... 15/268
3,307,303 A 3/1967 Bloxsom
3,378,980 A * 4/1968 Blitzer, Jr. ....................... 52/668
(Continued)

FOREIGN PATENT DOCUMENTS

BE 1 014 530 12/2003
CA 2337293 8/2002
(Continued)

OTHER PUBLICATIONS

Preliminary Report on Patentability for PCT/US2011/036138 dated Nov. 27, 2012 (5 pages).*
(Continued)

*Primary Examiner* — Brian Glessner
*Assistant Examiner* — Rodney Mintz
(74) *Attorney, Agent, or Firm* — Knobbe, Martens, Olson & Bear, LLP

(57) ABSTRACT

Some embodiments provide a fenestration apparatus including at least one glazing pane capable of being installed in an opening of a building envelope and a tessellated structure disposed adjacent to the at least one glazing pane. The tessellated structure can include at least one partition having a first face and a second face. The at least one partition can define a plurality of spatially separated cells within a substantially contiguous region of the opening. Each of the plurality of spatially separated cells can have a cell width and a cell depth. Each of the plurality of spatially separated cells can be at least partially surrounded by the first face of the at least one partition, the second face of the at least one partition, or a combination of the first face and the second face of the at least one partition.

12 Claims, 9 Drawing Sheets

(56) References Cited

U.S. PATENT DOCUMENTS

| | | | | | |
|---|---|---|---|---|---|
| 3,446,955 | A | * | 5/1969 | Bailey et al. | 362/290 |
| 3,863,251 | A | * | 1/1975 | Gould et al. | 340/815.53 |
| 3,919,543 | A | * | 11/1975 | Noren | 362/293 |
| 3,936,157 | A | * | 2/1976 | Kapany | 359/591 |
| 3,985,116 | A | * | 10/1976 | Kapany | 126/687 |
| 3,996,458 | A | * | 12/1976 | Jones et al. | 362/290 |
| 4,018,211 | A | | 4/1977 | Barr | |
| 4,035,539 | A | * | 7/1977 | Luboshez | 428/178 |
| 4,078,548 | A | * | 3/1978 | Kapany | 126/648 |
| 4,114,186 | A | | 9/1978 | Dominguez | |
| 4,126,379 | A | | 11/1978 | Wu | |
| 4,262,659 | A | * | 4/1981 | Brzezinski | 126/667 |
| 4,334,524 | A | | 6/1982 | McCullough et al. | |
| 4,429,952 | A | | 2/1984 | Dominguez | |
| 4,516,197 | A | * | 5/1985 | Yonkers | 362/342 |
| 4,539,625 | A | | 9/1985 | Bornstein et al. | |
| 4,557,565 | A | | 12/1985 | Ruck et al. | |
| 4,615,579 | A | | 10/1986 | Whitehead | |
| 4,733,505 | A | | 3/1988 | Van Dame | |
| 4,772,097 | A | * | 9/1988 | Takeuchi et al. | 359/894 |
| 4,780,800 | A | * | 10/1988 | Mullins | 362/342 |
| 4,851,979 | A | * | 7/1989 | Degelmann | 362/290 |
| 4,890,900 | A | * | 1/1990 | Walsh | 359/596 |
| 5,008,791 | A | * | 4/1991 | Caferro | 362/290 |
| 5,099,622 | A | | 3/1992 | Sutton | |
| 5,117,811 | A | | 6/1992 | Taylor | |
| 5,149,191 | A | * | 9/1992 | Lewin et al. | 362/290 |
| 5,220,462 | A | * | 6/1993 | Feldman, Jr. | 359/855 |
| 5,228,772 | A | | 7/1993 | Mitchell et al. | |
| 5,360,659 | A | * | 11/1994 | Arends et al. | 428/216 |
| 5,383,102 | A | * | 1/1995 | Jones | 362/510 |
| 5,432,683 | A | * | 7/1995 | Brown | 362/16 |
| 5,461,496 | A | * | 10/1995 | Kanada et al. | 359/592 |
| 5,467,564 | A | | 11/1995 | DeKeyser et al. | |
| 5,493,824 | A | | 2/1996 | Webster et al. | |
| 5,517,358 | A | | 5/1996 | Dominguez | |
| 5,528,471 | A | | 6/1996 | Green | |
| 5,546,712 | A | | 8/1996 | Bixby | |
| 5,556,186 | A | * | 9/1996 | Pilby | 362/16 |
| 5,570,239 | A | * | 10/1996 | Raimondi | 359/873 |
| 5,587,847 | A | * | 12/1996 | Chang et al. | 359/890 |
| 5,596,848 | A | | 1/1997 | Lynch | |
| 5,647,152 | A | * | 7/1997 | Miura | 40/541 |
| 5,648,873 | A | | 7/1997 | Jaster et al. | |
| 5,650,875 | A | * | 7/1997 | Kanada et al. | 359/592 |
| 5,655,339 | A | | 8/1997 | Deblock et al. | |
| 5,662,403 | A | | 9/1997 | Akashi et al. | |
| 5,729,387 | A | | 3/1998 | Takahashi et al. | |
| 5,735,262 | A | | 4/1998 | Houtman | |
| 5,806,972 | A | * | 9/1998 | Kaiser et al. | 362/290 |
| 5,830,548 | A | * | 11/1998 | Andersen et al. | 428/36.4 |
| 5,878,539 | A | | 3/1999 | Grubb | |
| 5,896,712 | A | | 4/1999 | Chao | |
| 5,896,713 | A | | 4/1999 | Chao et al. | |
| 5,897,201 | A | | 4/1999 | Simon | |
| 5,999,323 | A | | 12/1999 | Wood | |
| 6,000,170 | A | | 12/1999 | Davis | |
| RE36,496 | E | | 1/2000 | Sutton | |
| 6,035,593 | A | | 3/2000 | Chao et al. | |
| 6,090,464 | A | * | 7/2000 | Yoo | 428/73 |
| 6,104,854 | A | | 8/2000 | Masaki et al. | |
| 6,130,781 | A | | 10/2000 | Gauvin | |
| 6,142,645 | A | | 11/2000 | Han | |
| 6,178,707 | B1 | | 1/2001 | Bengtson | |
| 6,210,644 | B1 | * | 4/2001 | Trokhan et al. | 422/186.3 |
| 6,219,977 | B1 | | 4/2001 | Chao et al. | |
| 6,239,910 | B1 | * | 5/2001 | Digert | 359/596 |
| 6,256,947 | B1 | | 7/2001 | Grubb | |
| 6,321,493 | B1 | | 11/2001 | Rillie et al. | |
| 6,363,667 | B2 | | 4/2002 | O'Neill | |
| 6,363,668 | B2 | | 4/2002 | Rillie et al. | |
| 6,391,400 | B1 | * | 5/2002 | Russell et al. | 428/34 |
| 6,412,238 | B2 | | 7/2002 | Rillie et al. | |
| 6,415,563 | B2 | | 7/2002 | Rillie | |
| 6,438,803 | B2 | | 8/2002 | Rillie et al. | |
| 6,438,910 | B1 | | 8/2002 | Erskine | |
| 6,456,437 | B1 | | 9/2002 | Lea et al. | |
| 6,493,145 | B1 | | 12/2002 | Aoki et al. | |
| 6,502,950 | B2 | | 1/2003 | Signer | |
| 6,523,980 | B2 | * | 2/2003 | Sejkora et al. | 362/339 |
| RE38,217 | E | | 8/2003 | De Block et al. | |
| 6,623,137 | B1 | | 9/2003 | Marsonette | |
| 6,655,814 | B1 | | 12/2003 | Tagawa et al. | |
| 6,667,089 | B1 | * | 12/2003 | Barker | 428/73 |
| 6,698,909 | B2 | * | 3/2004 | Jones | 362/339 |
| 6,699,558 | B1 | | 3/2004 | Milburn | |
| 6,827,445 | B2 | | 12/2004 | Abe et al. | |
| 6,870,673 | B2 | | 3/2005 | Cromer et al. | |
| 7,040,061 | B2 | | 5/2006 | Rillie et al. | |
| 7,057,821 | B2 | | 6/2006 | Zincone | |
| 7,082,726 | B2 | | 8/2006 | Prenn et al. | |
| 7,134,254 | B1 | * | 11/2006 | Van Gelder | 52/793.1 |
| 7,146,768 | B2 | | 12/2006 | Rillie | |
| 7,159,364 | B2 | | 1/2007 | Rillie | |
| 7,168,211 | B2 | | 1/2007 | Prenn et al. | |
| 7,185,464 | B2 | | 3/2007 | Bracale | |
| 7,222,461 | B2 | | 5/2007 | Piano et al. | |
| 7,281,353 | B2 | * | 10/2007 | Konstantin | 49/82.1 |
| 7,296,908 | B1 | | 11/2007 | Pickard et al. | |
| 7,322,156 | B1 | | 1/2008 | Rillie et al. | |
| 7,350,327 | B1 | | 4/2008 | Logan et al. | |
| 7,395,636 | B2 | | 7/2008 | Blomberg | |
| 7,438,440 | B2 | | 10/2008 | Dorogi | |
| 7,455,422 | B2 | | 11/2008 | Gould et al. | |
| 7,481,552 | B2 | | 1/2009 | Mayfield, III et al. | |
| 7,501,768 | B2 | | 3/2009 | Lane et al. | |
| 7,510,305 | B2 | | 3/2009 | Straton et al. | |
| 7,517,113 | B2 | * | 4/2009 | Bruckner | 362/290 |
| 7,529,594 | B2 | | 5/2009 | Walters et al. | |
| 7,546,167 | B2 | | 6/2009 | Walters et al. | |
| 7,546,168 | B2 | | 6/2009 | Walters et al. | |
| 7,546,709 | B2 | | 6/2009 | Jaster et al. | |
| 7,576,647 | B1 | | 8/2009 | Mudge | |
| 7,585,088 | B2 | | 9/2009 | Tyson | |
| 7,586,408 | B1 | | 9/2009 | Mudge | |
| 7,603,184 | B2 | | 10/2009 | Walters et al. | |
| 7,614,767 | B2 | | 11/2009 | Zulim et al. | |
| 7,621,656 | B2 | | 11/2009 | Tyson | |
| 7,622,701 | B2 | | 11/2009 | Stevens et al. | |
| 7,639,423 | B2 | | 12/2009 | Kinney et al. | |
| 7,641,954 | B2 | * | 1/2010 | Rouanet et al. | 428/76 |
| 7,642,501 | B1 | | 1/2010 | Fassbender et al. | |
| 7,670,021 | B2 | | 3/2010 | Chou | |
| 7,690,816 | B2 | | 4/2010 | Tyson et al. | |
| 7,736,014 | B2 | | 6/2010 | Blomberg | |
| 7,737,640 | B2 | | 6/2010 | Marques et al. | |
| 7,757,444 | B1 | | 7/2010 | Halliday | |
| 7,761,260 | B2 | | 7/2010 | Walters et al. | |
| 7,771,095 | B2 | | 8/2010 | Dorogi | |
| 7,784,971 | B2 | | 8/2010 | Dorogi | |
| 7,806,550 | B2 | | 10/2010 | Tyson et al. | |
| 7,813,041 | B2 | | 10/2010 | Briee et al. | |
| 7,817,063 | B2 | | 10/2010 | Hawkins et al. | |
| 7,828,459 | B2 | | 11/2010 | Rains | |
| 7,839,295 | B2 | | 11/2010 | Ries, II | |
| 7,845,825 | B2 | | 12/2010 | Ramer et al. | |
| 7,845,829 | B2 | | 12/2010 | Shaner | |
| 7,850,342 | B2 | | 12/2010 | Abdelsamed | |
| 7,863,832 | B2 | | 1/2011 | Lane et al. | |
| 7,866,855 | B2 | | 1/2011 | Abdelsamed | |
| 7,883,237 | B2 | | 2/2011 | Zhang et al. | |
| 7,883,239 | B2 | | 2/2011 | Rains, Jr. et al. | |
| 7,886,492 | B2 | | 2/2011 | Kelly et al. | |
| 7,896,521 | B2 | | 3/2011 | Becker et al. | |
| 7,911,359 | B2 | | 3/2011 | Walters et al. | |
| 7,918,589 | B2 | | 4/2011 | Mayfield, III et al. | |
| 7,939,793 | B2 | | 5/2011 | Rains, Jr. et al. | |
| 7,939,794 | B2 | | 5/2011 | Rains et al. | |
| 7,950,817 | B2 | | 5/2011 | Zulim et al. | |
| 7,982,956 | B2 | | 7/2011 | Kinney et al. | |
| 7,997,762 | B2 | * | 8/2011 | Wang et al. | 362/249.02 |
| 8,010,319 | B2 | | 8/2011 | Walters et al. | |
| 8,018,653 | B2 | | 9/2011 | Jaster | |
| 8,056,289 | B1 | * | 11/2011 | Konstantin | 52/204.591 |

(56) References Cited

U.S. PATENT DOCUMENTS 8,073,303 B2 * 12/2011 Whang et al. ................ 385/146
8,082,705 B2 12/2011 Jaster et al.
8,098,433 B2 * 1/2012 Rillie et al. .................. 359/591
8,132,375 B2 3/2012 Jaster
8,300,323 B2 10/2012 Hoch et al.
8,371,078 B2 * 2/2013 Jaster .............................. 52/200
2001/0047630 A1 * 12/2001 Richardson ................. 52/204.5
2001/0048599 A1 * 12/2001 Hess ............................ 362/290
2001/0049915 A1 12/2001 Rillie et al.
2001/0049916 A1 12/2001 Rillie et al.
2001/0050852 A1 * 12/2001 Jones ........................... 362/339
2001/0052208 A1 12/2001 Rillie et al.
2001/0052209 A1 12/2001 Rillie et al.
2002/0051297 A1 5/2002 Hoy et al.
2002/0060283 A1 5/2002 Jordan et al.
2002/0073635 A1 6/2002 Erskine
2002/0085393 A1 7/2002 Eisenman et al.
2004/0050380 A1 3/2004 Abe
2004/0256000 A1 * 12/2004 Konstantin ................... 136/251
2005/0035713 A1 * 2/2005 Yoo .............................. 313/582
2005/0039789 A1 2/2005 Kim
2005/0048231 A1 * 3/2005 Morphet ......................... 428/34
2005/0074566 A1 * 4/2005 Rouanet et al. ................ 428/34
2005/0078483 A1 4/2005 Bernard et al.
2005/0128728 A1 6/2005 Eisenman et al.
2005/0166490 A1 8/2005 Darmer et al.
2005/0188629 A1 9/2005 Rillie et al.
2005/0243430 A1 11/2005 Cuttle
2005/0252111 A1 11/2005 Prenn et al.
2006/0007549 A1 1/2006 Zincone
2006/0133088 A1 * 6/2006 Caferro ........................ 362/290
2006/0144013 A1 * 7/2006 Rouanet et al. ............. 52/782.1
2006/0262250 A1 * 11/2006 Hobbs ............................ 349/96
2006/0288645 A1 * 12/2006 Konstantino et al. .......... 49/92.1
2007/0035841 A1 2/2007 Kinney et al.
2007/0163732 A1 7/2007 Konstantin et al.
2007/0271848 A1 11/2007 Wolf et al.
2008/0035275 A1 * 2/2008 Konstantin ....................... 160/5
2008/0055907 A1 * 3/2008 Bruckner ..................... 362/290
2008/0104903 A1 * 5/2008 Jaster ............................. 52/200
2008/0250733 A1 * 10/2008 Konstantin .................. 52/173.3
2008/0304263 A1 * 12/2008 Paulussen .................... 362/235
2009/0032102 A1 2/2009 Chen et al.
2009/0141487 A1 6/2009 Gould et al.
2009/0322250 A1 12/2009 Zulim et al.
2010/0053971 A1 3/2010 Aggarwal et al.
2010/0091396 A1 4/2010 Hutson et al.
2010/0110684 A1 5/2010 Abdelsamed et al.
2010/0127625 A1 5/2010 Minarczyk et al.
2010/0149804 A1 6/2010 Abdelsamed et al.
2010/0163157 A1 * 7/2010 Milburn ........................... 156/99
2010/0232158 A1 9/2010 McCanless
2010/0246193 A1 9/2010 Clifton et al.
2010/0271610 A1 10/2010 Soer et al.
2010/0274945 A1 10/2010 Westrick, Jr. et al.
2010/0309556 A1 12/2010 Jaster
2011/0019410 A1 1/2011 Ibanez et al.
2011/0032709 A1 2/2011 Tyson et al.
2011/0051413 A1 3/2011 Hand
2011/0067824 A1 * 3/2011 Konstantin et al. .... 160/176.1 R
2011/0103042 A1 5/2011 Tirrell et al.
2011/0110086 A1 5/2011 Barnwell et al.
2011/0127557 A1 6/2011 Ramer et al.
2011/0134649 A1 6/2011 Becker et al.
2011/0242810 A1 10/2011 Lopez Querol et al.
2011/0289869 A1 12/2011 Jaster et al.
2012/0033302 A1 * 2/2012 Suzuki et al. ................ 359/597
2012/0230020 A1 9/2012 Rillie et al.
2012/0255246 A1 10/2012 Jaster
2013/0083554 A1 4/2013 Jaster
2013/0135744 A1 * 5/2013 Jaster ........................... 359/597
2013/0170045 A1 * 7/2013 Hsu .............................. 359/599

FOREIGN PATENT DOCUMENTS

| | | | | |
|---|---|---|---|---|
| CN | 1399095 | A | | 2/2003 |
| CN | 201035179 | Y | | 3/2008 |
| CN | 201090939 | Y | | 7/2008 |
| CN | 101493205 | A | | 7/2009 |
| DE | 4012333 | C1 | * | 6/1991 |
| DE | 4140851 | A1 | * | 6/1993 |
| EP | 1 306 606 | | | 5/2003 |
| ES | 2 194 616 | | | 11/2003 |
| ES | 2 214 950 | | | 9/2004 |
| GB | 933113 | | * | 8/1963 |
| GB | 2 384 022 | | | 7/2003 |
| GB | 2 400 885 | | | 10/2007 |
| JP | 60142413 | | | 9/1985 |
| JP | 60164704 | | | 11/1985 |
| JP | 60166906 | | | 11/1995 |
| JP | H08 7619 | | | 1/1996 |
| JP | 2001 184913 | | | 7/2001 |
| JP | 2003 157707 | | | 5/2003 |
| KR | 10 0713802 | | | 5/2007 |
| KR | 10-2009-0113435 | | | 11/2009 |
| KR | 10 0970152 | | | 7/2010 |
| KR | 10 2011 0032039 | | | 3/2011 |
| KR | 10 2011 0062239 | | | 6/2011 |
| WO | WO 2006/028703 | | | 3/2006 |
| WO | WO2010/070169 | | | 6/2010 |
| WO | WO 2011149675 | A3 | * | 10/2012 |

OTHER PUBLICATIONS

Machine Translation for DE 4140851 (8 pages).*
Machine Translation for DE 4012333 (4 pages).*
Preliminary Report on Patentability for PCT/US2011/036138 dated Nov. 27, 2012 (5 page).
Machine Translation for DE 4140851 (8 pages), (retrieved frome Espacenet.com on Mar. 7, 2013).
Machine Translation for De 4012333 (4 pages), (retrieved from Espacenet.com on Mar. 7, 2013).
Sunflower Corporation, "Sustainable Commercial Daylighting Technical Overview", undated, received on Dec. 11, 2009.
Daylight Engineering Brochure, Espacio Solar Tecnologia Bioclimatica, received on May 22, 2012; publication date unknown.
"Espacio Solar, enginyers de la Ilum natural", Sep. 2009, pp. 22-25.
"Sun Pipes Deplosun: A new Skylight", 2011, printed on May 24, 2012, from web address http://www.espaciosolar.net/suntunnels.htm, pp. 1-4.
"3M Daylighting Film DF2000MA", Product Bulletin DF2000MA, Release A, Jun. 2006, 3M Graphics Market Center, St. Paul, MN.
Ge et al., "Heat Loss Calculation of Compound Honeycomb Solar Collection"; Journal of Thermal Science, vol. 2, No. 4, pp. 254-259, Oct. 1993.
Kaushika et al., "Solar Transparent Insulation Materials: A Review"; Renewable and Sustainable Energy Reviews, vol. 7, pp. 317-351, 2003.
"LED Light add on Kit for skylight tubes," Wild Ideas Light Company Ltd., published at least as early as Apr. 2009.
"2301 Optical Lighting Film" Technical Specification, Effective Date: Feb. 1, 2000, 3M Specified Construction Products Department, http://www.mmm.com/office.

* cited by examiner

| Cell Width | 0.5" | 1.0" | 1.5" | 2.0" |
|---|---|---|---|---|
| ■ 0.5" | 4 | 8 | 12 | 16 |
| ▲ 1.0" | 2 | 4 | 6 | 8 |
| × 1.5" | 1.33 | 2.67 | 4 | 5.33 |

THERMALLY INSULATING FENESTRATION DEVICES AND METHODS

BACKGROUND

1. Field

This disclosure relates generally to fenestration and more particularly to fenestration devices and methods that provide thermal insulation.

2. Description of Related Art

Many buildings have walls, ceilings, and/or roofs that at least partially block light from the exterior environment from entering such buildings. Fenestration devices and methods can be used to allow some exterior light to pass into a building. They can also allow occupants of the building to view the outside environment and/or permit daylight to substantially illuminate the building interior. Fenestration devices include windows, skylights, and other types of openings and coverings for openings. A window is typically positioned in an opening of a building wall, while a skylight is typically positioned in an opening of a building roof or ceiling. There are numerous types of skylights, including, for example, plastic glazed skylights, glass glazed skylights, light wells, and tubular daylighting devices ("TDDs"). Light wells and tubular daylighting devices transport exterior light from the roof to the ceiling of the building interior.

SUMMARY

Example embodiments described herein have several features, no single one of which is indispensible or solely responsible for their desirable attributes. Without limiting the scope of the claims, some of the advantageous features of some embodiments will now be summarized.

Some embodiments provide a fenestration apparatus including at least one glazing pane capable of being installed in an opening of a building envelope and a tessellated (e.g., spatially delineated) structure disposed adjacent to the at least one glazing pane. The tessellated structure can include at least one partition having a first face and a second face. The at least one partition can delineate, at least in part, a plurality of spatially separated cells within a substantially contiguous region of the opening. The volume within each cell may or may not be completely isolated from the volumes of the other cells. The cells may or may not share one or more common walls. Each of the plurality of spatially separated cells has a cell width and a cell depth. Each of the plurality of spatially separated cells is at least partially surrounded by the first face of the at least one partition, the second face of the at least one partition, or a combination of the first face and the second face of the at least one partition.

In certain embodiments, the luminous reflectance of the first face of the at least one partition is greater than or equal to about 95%. In some embodiments, the luminous reflectance of the second face of the at least one partition is greater than or equal to about 95%. In some embodiments, the luminous reflectance of each of the first face and the second face of the at least one partition can be greater than or equal to about 99%. The at least one partition can include a plurality of reflective film segments. In some embodiments, the fenestration devices can include a plurality of partitions.

The tessellated structure can include a honeycomb structure, such as, for example, a cubic prismatic honeycomb structure or a hexagonal prismatic honeycomb structure, or any other suitable structure.

The apparatus can include a second glazing pane. The tessellated structure can be disposed between the at least one glazing pane and the second glazing pane. In some embodiments, the fenestration apparatus is positioned such that exterior light passes through the second glazing pane after passing through the tessellated structure. In some embodiments, the fraction of visible light exiting the second glazing pane can be greater than or equal to about 85% of the visible light entering the fenestration apparatus The cell depth of each of the plurality of spatially separated cells can be greater than or equal to about 0.5 inches. The cell width of each of the plurality of spatially separated cells can be less than or equal to about 2 inches.

The building envelope can include a roof, a wall, and/or other building elements. The opening in the building envelope can include an internally reflective tube extending between an aperture in the roof and a location inside of a building.

Certain embodiments provide a method of providing light inside of a building. The method can include the steps of positioning at least one glazing pane in an opening in the building envelope and positioning a tessellated structure adjacent to the at least one glazing pane. The tessellated structure can include at least one partition having a first face and a second face. The at least one partition can define a plurality of spatially separated cells within a substantially contiguous region of the opening. Each of the plurality of spatially separated cells has a cell width and a cell depth. Each of the plurality of spatially separated cells is at least partially surrounded by the first face of the at least one partition, the second face of the at least one partition, or a combination of the first face and the second face of the at least one partition. The luminous reflectance of the first face of the at least one partition can be any suitable value, such as, for example, greater than or equal to about 95%.

The method can include providing a double glazing unit incorporating the at least one glazing pane and a second glazing pane. The tessellated structure can be disposed between the at least one glazing pane and the second glazing pane. The method can include providing a diffuser and positioning the diffuser adjacent to or near the tessellated structure. The diffuser can be configured to refract or reflect light propagating through the diffuser in a manner that alters or obscures the view of the fenestration device from inside the building.

Some embodiments provide a method of manufacturing a fenestration apparatus. The method can include the steps of dividing a sheet of reflective film into a plurality of segments having a segment length; forming at least a first loop of film, a second loop of film, and a third loop of film from the plurality of segments; inserting a first mandrel into the first loop of film and expanding the first mandrel until the first loop reaches a desired shape; inserting a second mandrel into the second loop of film and expanding the second mandrel until the second loop reaches a desired shape; adhering the second loop to the first loop while the first mandrel is inserted into the first loop and the second mandrel is inserted into the second loop; inserting the first mandrel or a third mandrel into the third loop of film and expanding that mandrel until the third loop reaches a desired shape; adhering the third loop to the second loop while the first mandrel or the third mandrel is inserted into the third loop and the second mandrel is inserted into the second loop. The first loop, the second loop, and the third loop can form an assembled cell structure. Additional loops can be adhered to the assembled cell structure until the assembled cell structure substantially fills an aperture of the fenestration apparatus. In some embodiments, the assembled cell structure can form a honeycomb structure. The segment length of each of the plurality of segments can be greater than or equal to the perimeter of a cell in the assembled cell structure.

Certain embodiments provide a method of manufacturing a fenestration apparatus with a tessellated structure comprising a plurality of polygonal cells. The method can include the steps of providing a first strip of film and a second strip of film; crimping the first strip of film and the second strip of film at increments equal to the lengths of the sides of the polygonal cells; bonding the first strip of film to the second strip of film together at points that are selected to create an assembled cell structure comprising individual cells having desired polygonal shapes; and creating additional assembled cell structures until the assembled cell structures substantially fill all or a portion of an aperture of the fenestration apparatus.

In some embodiments, the assembled cell structures can be secured between first and second glazing panes. At least one of the first strip of film and the second strip of film can include a material having a luminous reflectance greater than or equal to about 95% when measured with respect to CIE illuminant $D_{65}$.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers may be reused to indicate correspondence between reference elements.

DETAILED DESCRIPTION OF PREFERRED EMBODIMENTS

Figure 1:
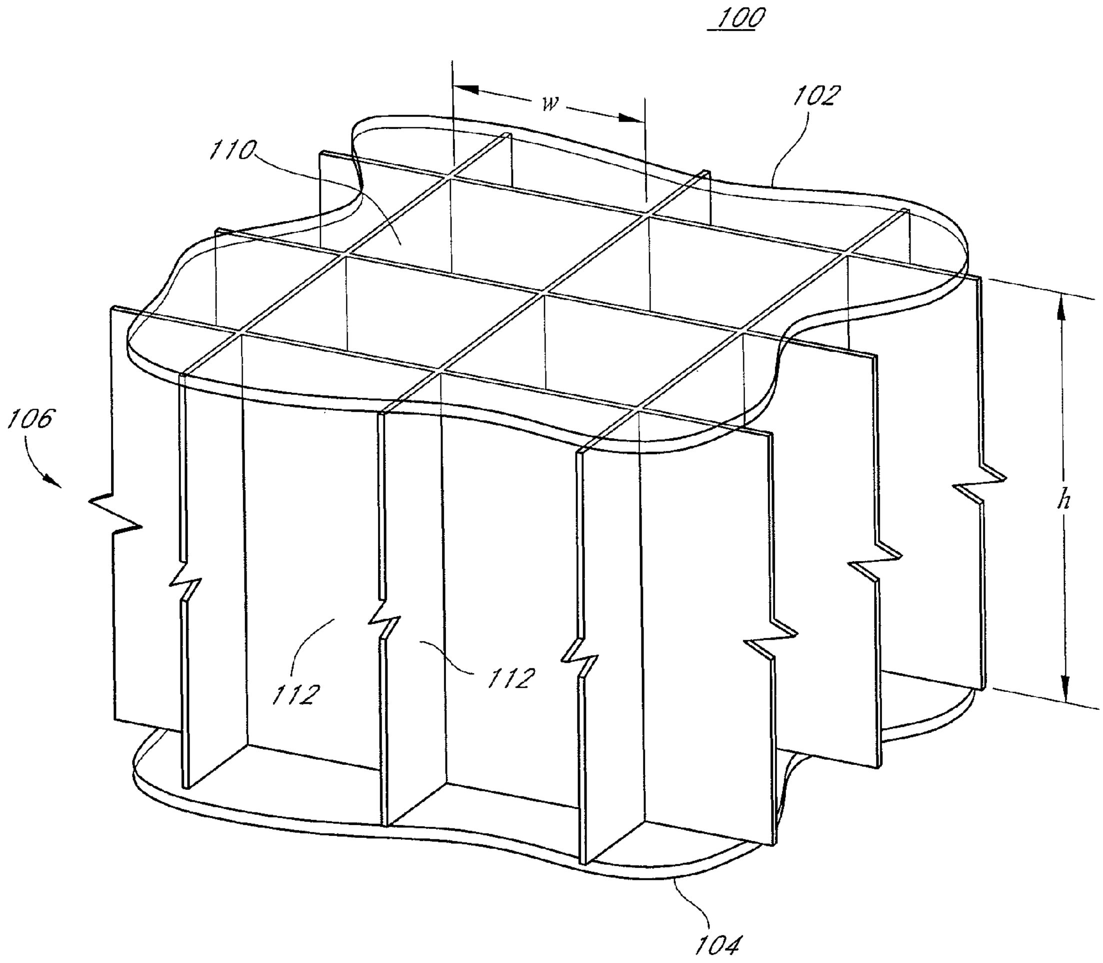
FIG. 1 is a partial perspective view of a double-glazed fenestration device.

Although certain preferred embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Fenestration products can be designed to allow occupants inside a building to view the exterior environment. Such products can also allow sunlight to illuminate the building interior. In some embodiments, a fenestration device is positioned in an opening of the ceiling or roof of the building. As used herein, the terms “fenestration,” “fenestration device,” “fenestration apparatus,” “fenestration method,” and similar terms are used in their broad and ordinary sense. For example, fenestration devices can include skylights, windows, walls, panels, blocks, doors, screens, shafts, apertures, tubes, other structures that are not completely opaque, or a combination of structures.

Fenestration devices that are installed in an opening of a roof or ceiling of a building are often called skylights, while fenestration devices installed vertically or in an opening of a wall are often called windows. Skylights and windows can include a transparent or translucent glazing, which can be made from a variety of materials, such as plastic, glass, clear material, prismatic material, translucent material, another material that is not completely opaque, a combination of non-opaque materials, or a combination of one or more non-opaque materials and one or more opaque materials. Tubular daylighting devices and light wells are examples of skylights that can transport light from the roof of a building to the ceiling and the building interior.

A glazing can suffer from one or more performance limitations. For example, the incident angle of the sun to a glazing surface can vary considerably throughout the day and year due to the movement of the sun. A change in the incident angle of sunlight can affect the optical transmission characteristics of the glazing. Transmission characteristics can also vary based on the index or indices of refraction of materials used in the glazing.

Non-opaque glazing materials tend to have relatively high thermal conductivity and light transmission in comparison to opaque building materials used in the remaining building envelope. For at least this reason, fenestration devices and methods can be large contributors to heat loss or heat gain in a building.

A fenestration device can be configured to reduce building heat loss or heat gain. For example, one or more panes of a glazing can include a spectrally selective coating that has low emissivity properties such that the transmission of infrared radiation across the panes is decreased. In a double glazed system, the interior pane can be coated with a spectrally selective coating to reduce emission of energy at infrared wavelengths from the warm interior pane outward during cold weather. Low emissivity coatings can also reflect sunlight entering the glazing, thereby reducing solar heat gain of the building during warmer months. However, a glazing with a low emissivity coating can have lower visible light transmission compared to an uncoated glazing.

As another example, filling the space between panes of a multiple pane glazing with an inert gas can reduce conduction heat losses because inert gases generally have lower thermal conductivity than air. This technique can also reduce convection losses because inert gasses are generally heavier than air and can suppress gas movement. However, it can be difficult for a glazing unit to maintain a good seal to prevent leakage of these gases.

As a further example, filling the space between panes of a multiple pane glazing with aerogel can reduce heat loss and heat gain. Aerogel can reduce conduction and convection losses due to the large number of very small air pockets therein. The air pockets can reduce thermal conductivity because stationary air is a good thermal insulator. Aerogel is generally translucent and can reduce transmission of visible light through the glazing.

In the embodiment shown in FIG. 1, a double glazed fenestration device 100 includes a structure 106 configured to reduce thermal energy transfer between two glazing panes 102, 104. Only a portion of the device 100 is shown in FIG. 1 so that details can be better shown. The overall dimensions of the device 100 can be selected to partially fill, substantially fill, or completely fill a fenestration. A tessellated structure, such as, for example, the cubic honeycomb structure 106 shown in FIG. 1, can have certain properties that are useful in suppressing thermal radiation and convection when placed between two panes 102, 104 that are at different temperatures. As used herein, the term "tessellated structure" is used in its broad and ordinary sense. For example, tessellated structures encompass structures with a cross-sectional tiling, structures that are generally cellular, structures that resemble a honeycomb, honeycomb structures, prismatic honeycomb structures, hexagonal prismatic honeycomb structures, cubic prismatic honeycomb structures, irregular honeycomb structures, a structure that is at least partially a honeycomb structure, other polygonal structures, a combination of structures, etc.

In some embodiments, the tessellated structure 106 of a fenestration device 100 includes a plurality of cells 110 at least partially defined by one or more walls 112. Long wave infrared radiation can be emitted from a pane 104 of a fenestration device 100 in a hemispherical pattern and can intersect the walls 112 of the tessellated structure 106 based on the depth h and width w between walls 112. If the walls 112 absorb the radiation and have a high emissivity, the walls 112 can reradiate at least a portion of the radiation energy back towards the pane 104 and towards other walls 112 of the tessellated structure 106. The walls 112 can be configured to absorb a substantial amount of radiation at infrared wavelengths, including wavelengths at which thermal energy is commonly transferred at temperatures occurring on the Earth's surface. The absorption and reradiation of thermal energy by the tessellated structure 106 can reduce the amount of radiation intercepting the other glazing plane 102 and radiating out to the atmosphere. In some embodiments, the walls 112 of the tessellated structure 106 include a material system that absorbs a substantial amount of radiation at infrared wavelengths, has a high emissivity at infrared wavelengths, and is highly reflective at visible wavelengths of sunlight.

In certain embodiments, the fenestration device 100 is configured to reduce thermal energy transfer between panes 102, 104 due to convection. The tessellated structure 106 between the panes 102 can reduce convection because the width w between the walls 112 surrounding a cell 110 can be much less than the aperture of the fenestration. Heat transfer between the panes 102 by convection can also be influenced by the depth h between the glazing panes 102, 104. In certain embodiments, an increased depth h between the glazing panes 102, 104 can cause a reduction in heat loss through convection. The Rayleigh number of the fenestration device 100 can be influenced at least in part by the width w of the cells 110 and the depth h of the cells in the tessellated structure 106. The cell width w and depth h can be selected to reduce, minimize, or substantially eliminate the movement of air between the bottom glazing pane 104 and the top glazing pane 102, as described in further detail herein. When the bottom pane 104 is warmer than the top pane 102, reducing the movement of air from the bottom pane 104 to the top pane 102 can reduce heat loss through a fenestration.

The tessellated structure 106 of the fenestration device 100 can be constructed from any suitable material system. At least a portion of the material system can be substantially transparent at least in the visible range, can be substantially reflective at least in the visible range, or can be partially transparent and partially reflective. The tessellated structure 106 can allow visible light to propagate between glazing panes 102, 104. The efficiency of light transfer between the panes 102, 104 can depend on the transmissive or reflective qualities of the material system, the dimensions and geometry of the tessellated structure 106, and the incident angle of light entering the device 100 in relation to the optical elements of the device 100.

In some embodiments, the walls 112 of the tessellated structure 106 are substantially vertical, and pairs of walls 112 within the structure 106 can be substantially parallel. The structure 106 can be disposed between two substantially horizontal glazing panes 102, 104. The walls 112 can be made substantially reflective using any suitable technique. For example, the walls 112 can be constructed from a reflective film. The film can form a plurality of closed cells 110, similar to a honeycomb. Many other variations are possible. For example, the walls 112 can be covered with a reflective film or coating or can be constructed from a rigid material, such as a rigid reflective material. The cells 110 can have any suitable geometry, including a square, a hexagon, a triangle, a circle, another multiple sided shape, a shape with curved or irregular sides, or a combination of geometries. In some embodiments, the material system of the tessellated structure 106, the cell depth h, the cell width w, and the cell geometry can be selected to reduce thermal heat transfer between the panes 102, 104.

In certain embodiments, the cells 110 of the tessellated structure 106 are constructed at least partially from DF2000MA Daylighting Film available from the 3M Company of Maplewood, Minn. DF2000MA Daylighting Film has greater than 99% reflectivity of visible light wavelengths and less than 10% long-wavelength infrared reflectivity (between 1,000 nm and 3,000 nm). The DF2000MA film also has emissivity greater than 0.90, thermal conductivity of approximately 1.5 BTU/hr-ft$^2$-° F./inch, and has a thickness that is less than or equal to 0.0027 inches. By way of example, the thickness of a cell wall can be substantially less than the thickness of a glazing layer in the fenestration device, and/or substantially less than the width of a cell.

The cells 110 can be constructed from many other films or materials. In some embodiments, the film or material used to form or cover the walls 112 of the cells 110 can be highly reflective. For example, the film can have a luminous reflectance greater than or equal to about 95%, greater than or equal to about 98%, or greater than or equal to about 99%. The film or material can be selected to reduce radiation losses. For example, the film or material can be configured to absorb and emit a substantial portion of (or substantially all of) long wavelength infrared radiation. The cells 110 can be constructed from a coated material, a rigid material, a flexible material, another material, or a combination of materials. The cells 110 can be shaped and dimensioned to reduce heat transfer due to convection. The geometries of the cells 110 can have a large influence on the thermally insulating capabilities of the fenestration device 100 by reducing, minimizing, or substantially eliminating convection.

As an example, a computer model was created to simulate the thermal losses due to convection and conduction in a double glazed fenestration device having a honeycomb structure disposed between a top glazing pane and a bottom glazing pane. Honeycomb structures with various dimensional and geometric configurations were simulated. The model also simulated the thermal losses from the same double glazed fenestration device without the honeycomb structure. The test conditions included applying a temperature difference of 70° F. across the device. The bottom pane was exposed to stagnant air temperature of 70° F. and the top pane was exposed to 0° F. with a wind speed of 12.3 mph across its surface. Both panes were in a horizontal plane (e.g., parallel to the ground). Results of the simulations are shown in Table 1.

TABLE 1

| Honeycomb (HC) Configuration | Glazing Separation (Inches) | HC Dimensions Side Length/Cell Area (Inches)/(Sq. Inches) | U-Factor (BTU/Hr-$Ft^2$-° F.) |
|---|---|---|---|
| No HC | 1.0 | — | 0.70 |
| Square | 1.0 | 1.5/2.25 | 0.46 |
| Square | 1.0 | 1.0/1.0 | 0.41 |
| Square | 1.0 | .5/25 | 0.33 |
| Hexagon | 1.0 | .93/2.25 | 0.46 |
| Triangle | 1.0 | 2.28/2.25 | 0.52 |
| No HC | 1.5 | — | 0.67 |
| Square | 1.5 | 1.5/2.25 | 0.36 |
| Square | 1.5 | .5/.25 | 0.26 |

The results in Table 1 show that a substantial reduction in the rate of heat transfer due to convection can occur when a suitable tessellated structure, such as a honeycomb structure, is disposed between the glazing panes. In some embodiments, the reduction in the rate of heat transfer can be greater than or equal to about 25%, greater than or equal to about 35%, greater than or equal to about 40%, greater than or equal to about 50%, or greater than or equal to about 60%. The simulations evaluated the rate of thermal energy transfer due to conduction and convection; however, thermal energy transfer due to radiation can also vary depending on the configuration of a tessellated structure between glazing panes. The simulated honeycomb configuration was constructed from a film having a thickness of 0.010" and a thermal conductance 7.5 times greater than the conductance of air. Therefore, when comparing the thermal loss of the configurations without the honeycomb structure to the configurations with a honeycomb structure, the loss due to conduction was greater in the configurations with the honeycomb. This indicates that the significant reductions in the rate of heat transfer in the configurations including a honeycomb structure can result from a large reduction in heat transfer due to convection.

The cell dimensions of a tessellated structure can be selected to reduce or minimize the rate of heat transfer across a fenestration device. For example, if the tessellated structure is a honeycomb having a generally square cell configuration, the results in Table 1 show that convection loss performance can be improved by reducing cell sizes, by increasing cell depth, or by reducing cell sizes and increasing cell depth. Fenestration device configurations having different distances between panes can nonetheless be designed to have similar convection loss performance characteristics by selecting a suitable cell width. For example, if two double glazed devices have 1" and 1.5" pane separations, respectively, and if the minimum U-factor requirement is 0.33, the honeycomb structure could have square cells with a width of 0.5" for the configuration with 1" of pane separation. The configuration with 1.5" of pane separation could have similar convection loss performance with a honeycomb structure having square cells with a width of 1". In some embodiments, multiple pane glazing units having different amounts of separation between panes can be modified to achieve the same thermal requirements without modifying the separation between panes of any glazing unit.

The geometry or topology of cells in a tessellated structure can be selected to reduce or minimize the rate of heat transfer across a fenestration device. For example, the results in Table 1 show that, in some embodiments, changing the cell topology from a square to a hexagon and maintaining the same cell area can result in a negligible change in U-factor performance. Changing the cell topology to a triangle while maintaining the same cell area reduced convection loss performance. Making a tessellated structure having triangular cells can require more wall material per aperture area than making a tessellated structure having square or hexagonal cells.

Figure 2:
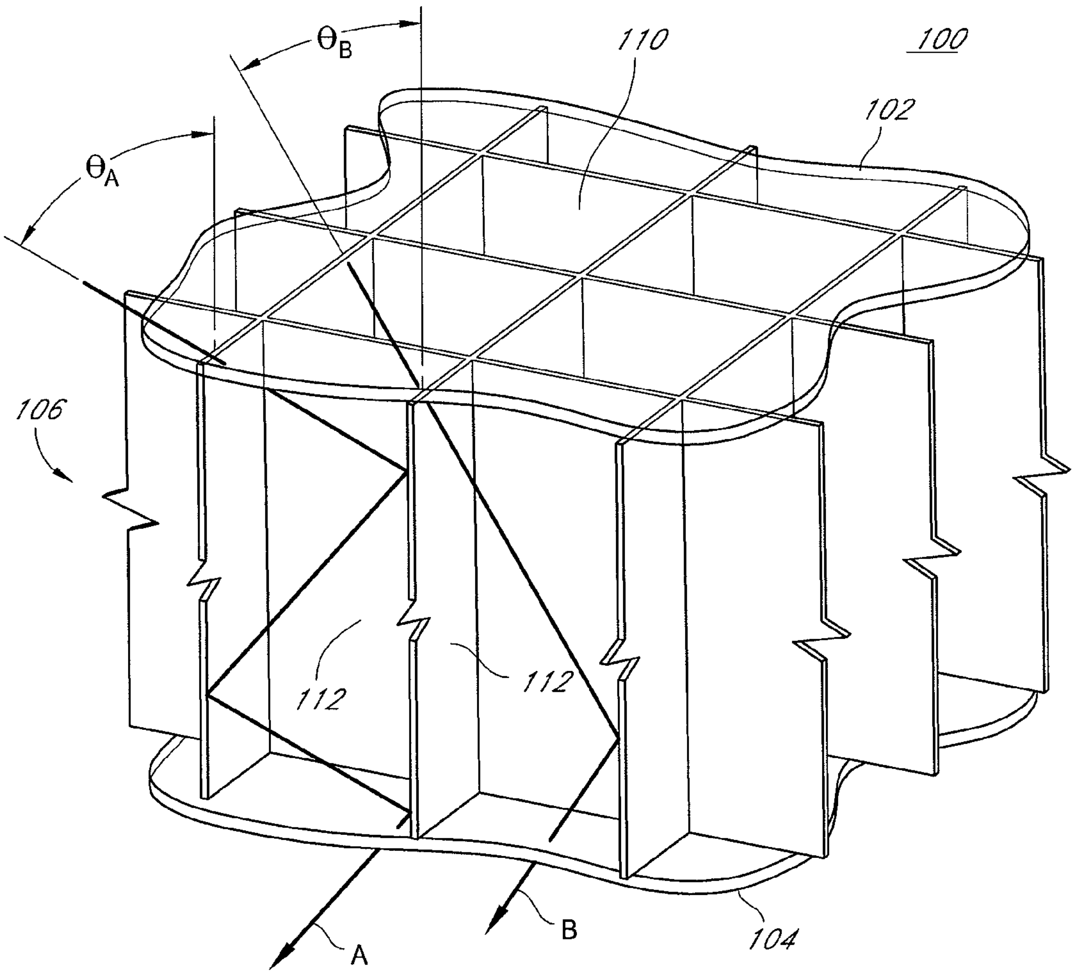
FIG. 2 is a schematic ray diagram showing propagation of light through the fenestration device shown in FIG. 1.

Constructing the cells of the tessellated structure from a material with high visible reflectivity can improve convection loss performance without substantially reducing visible light transmission through the tessellated structure. For example, if the cells are made from a film with high visible reflectivity, the cells can be configured to have a high cell depth to cell area ratio (e.g., at least about 2.0, or at least about 2.5, or at least about 7.5, etc.) with negligible light loss over a wide range of incident angles. In the embodiment shown in FIG. 2, a tessellated structure 106 includes cells 110 with walls 112 constructed from a material with high visible reflectivity. A light ray A entering the device 100 with an incident angle $\theta_A$ of 60° at the top pane 102 propagates through the pane 102 and reflects off walls 112 of the tessellated structure 106 three times before propagating through the lower pane 104 and out the opposite side of the device 100. A light ray B entering the device 100 with an incident angle $\theta_B$ of 30° at the top pane 102 propagates through the pane 102 and reflects off walls 112 of the tessellated structure 106 once before propagating through the lower pane 104 and out the opposite side of the device 100. In some embodiments, the fraction of visible light incident on the top pane 102 that exits the bottom pane 104 of the device 100 is substantially the same for both light rays A, B when the walls 112 have high reflectivity.

The data shown in Table 2 provides the light transfer efficiency for two fenestration device configurations having a honeycomb structure with hexagonal cells. Configurations having two different cell depths were simulated using a reflective material with a reflectivity of 99%. In the simulation, the cell width was 0.42", the cell side length was 0.28", and the cell area was 0.20 square inches.

TABLE 2

| Incident Angle (degrees) | Cell Depth of 0.5" Depth/Area of 2.5 | Cell Depth of 1.5" Depth/Area of 7.5 |
|---|---|---|
| 30 | 99% | 97% |
| 45 | 99% | 96% |
| 60 | 97% | 93% |
| 75 | 95% | 85% |

Figure 3:
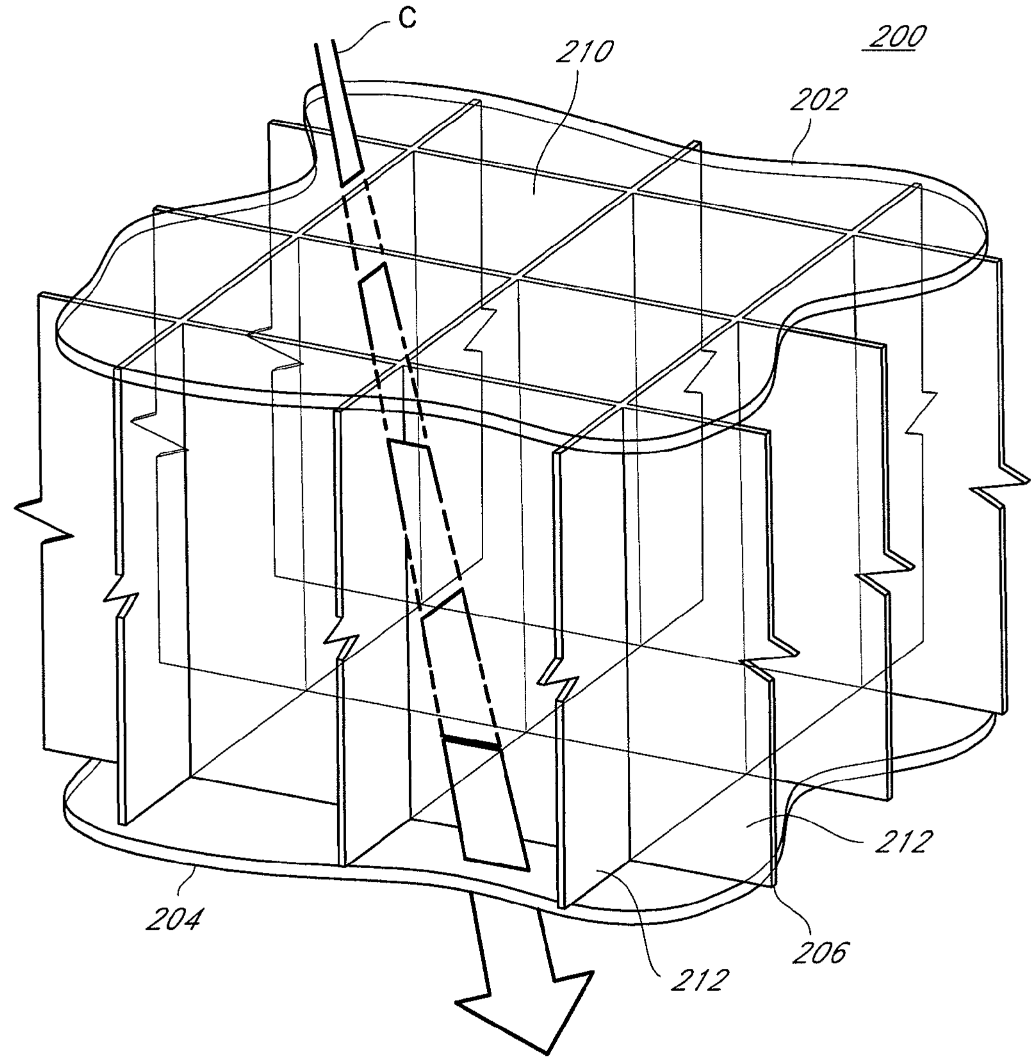
FIG. 3 is a schematic diagram showing another double-glazed fenestration device.

In the embodiment illustrated in FIG. 3, a fenestration device 200 has a tessellated structure 206 having walls 212 that are partially, substantially, or nearly completely transparent or translucent in the visible range. The tessellated structure 206 is disposed between transparent panes 202, 204. In the illustrated embodiment, the fraction of light C incident at the top pane 202 of the device 200 that exits the bottom pane 204 can be substantially lower than the fraction of light that would exit the bottom pane 104 of the device 100 shown in FIG. 2. The difference in the fraction of light exiting the device can be caused by surface reflections, absorption, and scattering that occurs when light C propagates through the transparent walls 212. The light losses that occur as the light C propagates through many layers of transparent material in the tessellated structure 206 can result in reduced or eliminated thermal insulation benefits when compared to a fenestration device 100 having a tessellated structure 106 with highly reflective walls 112.

Tessellated structure configurations with transparent or translucent walls 212 can suppress heat loss from glazings or solar collectors by absorbing radiation at infrared wavelengths or by reducing convection. In such configurations, light is transmitted through the walls 212 of the tessellated structure 206. When light is incident on such a configuration at a high incident angle, the fraction of visible light that exits the tessellated structure 206 can be substantially reduced in comparison to the fraction of visible light that exits a tessellated structure 106 with highly reflective walls 112.

In order to mitigate the loss of visible light in such configurations, some embodiments include transparent sidewalls 212 that absorb a relatively small fraction of visible light. For example, a highly transmissive sidewall 212 may have a luminous transmittance of greater than or equal to about 97%, greater than or equal to about 99%, or nearly 100%. In order to attain high transmittance, at least a portion of the sidewall 212 may be very thin (e.g., less than or equal to about 3 mm (about 0.12 inches), less than or equal to about 1 mm (about 0.04 inches), less than or equal to about 600 μm (about 0.024 inches), or less than or equal to about 300 μm (about 0.012 inches)), may include at least one high strength material, may be constructed from highly transparent material(s), may be fabricated to be free from absorptive materials or impurities, or may include a combination of transmittance-enhancing features. In certain embodiments, the sidewall 212 includes an anti-reflection coating, film, or layer configured to substantially reduce or eliminate luminous reflectance at one or more interfaces between the sidewall 212 and the surrounding medium (or media). As used herein, the luminous transmittance and luminous reflectance can be measured with respect to a standard daylight illuminant, such as CIE illuminant $D_{65}$.

In some embodiments, a fenestration device has a tessellated structure disposed between two spaced apart transparent glazing panes, wherein the distance between the glazing panes is greater than or equal to about one-half inch. Such a fenestration device can be used in conventional skylights, tubular daylighting devices, windows, or with any product where high visible transmission and low heat loss is desired. The fenestration device can reduce convection losses between a warm side of the product and a cooler side of the product. Thus, the device can be beneficial during cold or warm periods of the year.

In some embodiments, a tessellated structure as described herein is incorporated into a solar thermal flat plate and concentrating collectors. The honeycomb can be disposed between a thermal heat collection plate and an outer glazing on the flat plate. The concentrating collector can focus light with a refractive or reflective optical device onto a smaller heat collection tube or plate. In some embodiments, the tessellated structure can be placed between the heat collecting receiver and a transparent cover. The backside or non-optical portion of this receiver can be covered with opaque insulation material to reduce heat loss.

Certain embodiments provide methods of manufacturing a tessellated structure as described herein. In some embodiments, the tessellated structure is constructed using a thin reflective film. The film can be manufactured as a continuous web and rolled onto a core. The web can be divided into strips having a width equal to the depth dimension of the honeycomb. Adhesive or another bonding material can be coated or applied to one side of the film. The strips of film can be cut into segments having a length greater than or equal to the perimeter of one or more of the cells of the tessellated structure. The lengths of the segments can be somewhat greater than the perimeter of the cells so that some length of the segment can be used to form an overlapping bond.

Figures 4A, 4B, 4C, 4D:
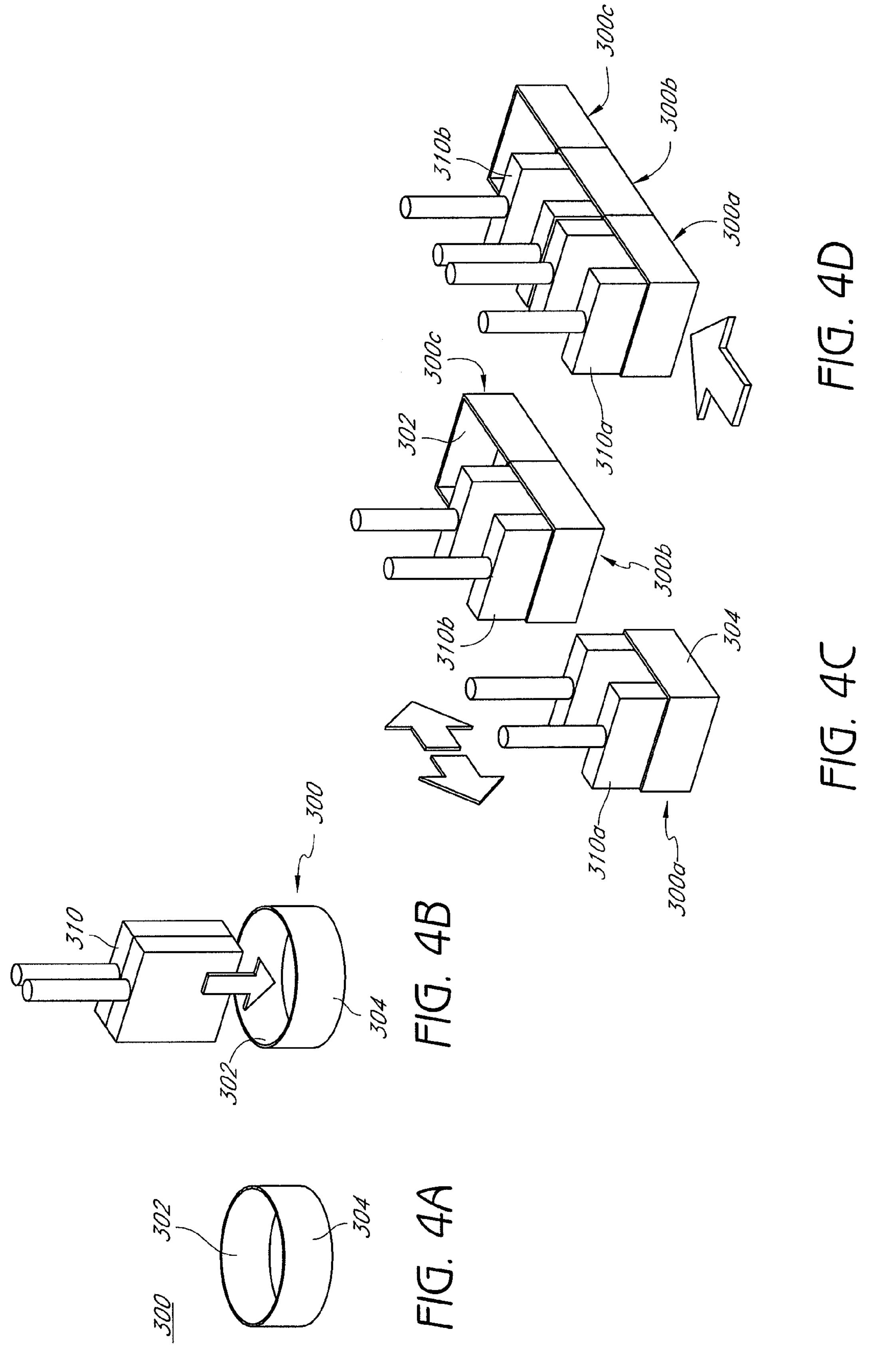
FIG. 4A is a perspective view of an unshaped tessellated structure cell.
FIG. 4B is a schematic diagram of an apparatus for forming tessellated structure cells.
FIG. 4C is a schematic diagram showing the operation of an apparatus for forming tessellated structure cells.
FIG. 4D is a schematic diagram showing the operation of an apparatus for forming tessellated structure cells.

One end of the strip segment can be bonded to the opposite end of the strip segment to form a film loop 300 with a reflective side 302 facing inward and an adhesive side 304 facing outward, as shown in FIG. 4A. An expandable mandrel 310 can be inserted into the film loop 300 and expanded to cause the film loop to conform to a desired cell shape. The expandable mandrel 310 can include two or more paddles that are together when inserted into the loop 300, as shown in FIG. 4B. A plurality of expandable mandrels configured to conform loops of film to the shapes of cells in the tessellated structure can be used. As shown in FIG. 4C, a first expandable mandrel 310*a* can be used to shape a film loop 300*a* while a second expandable mandrel 310*b* temporarily remains within a previously shaped loop 300*b* to provide support for adhering the film loop 300*a* to the previously shaped loop 300*b*. As shown in FIG. 4D, the newly shaped loop 300*a* can be mated to previously shaped loops 300*b*, 300*c* by pressing the newly shaped loop 300*a* against the other shaped loops 300*b*, 300*c*, which are supported by the second mandrel 310*b*. The adhesive sides 304 of the shaped loops bond with one another when they are pressed together. This process can be repeated until the desired tessellated structure configuration is achieved.

Figure 5:
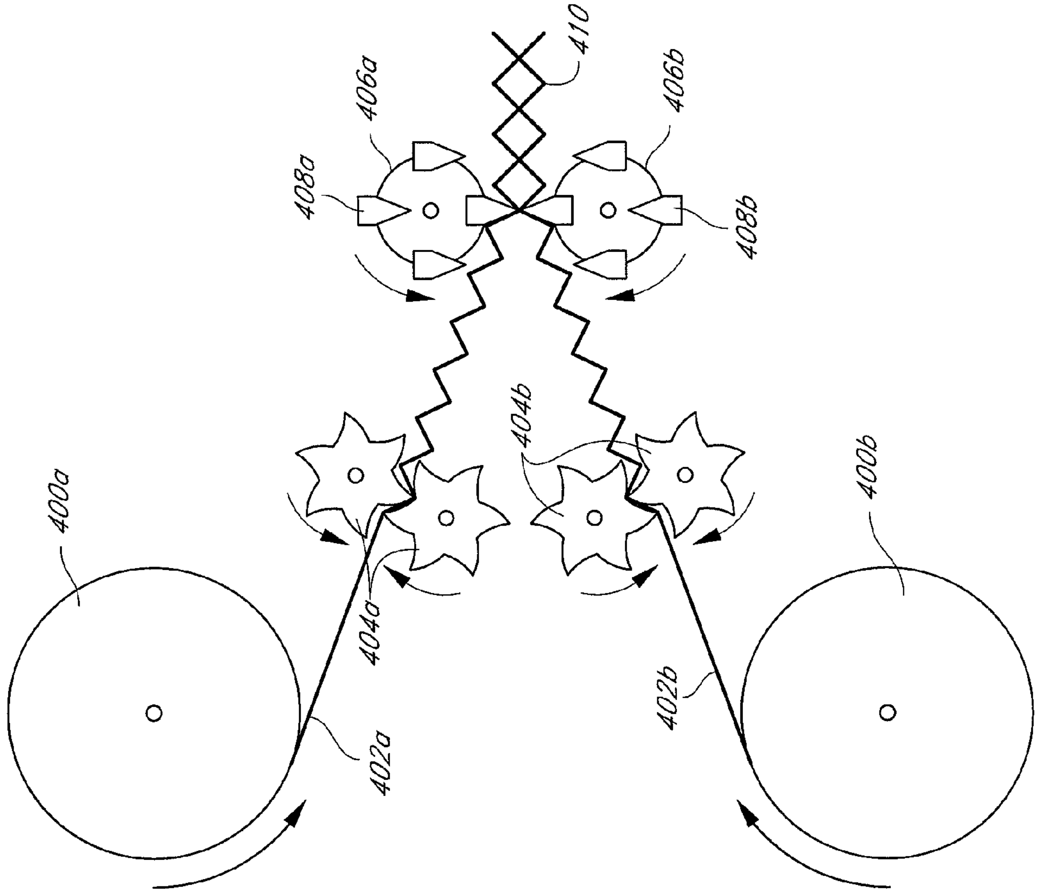
FIG. 5 is a schematic diagram showing the operation of another apparatus for forming tessellated structure cells.

In the embodiment shown in FIG. 5, a tessellated structure is made from rolls of film 400*a*, 400*b* without using an adhesive. The strips of film 402*a*, 402*b* can be drawn through a series of nip rollers 404*a*, 404*b* configured to crease or crimp the film 402*a*, 402*b* in increments equal to the lengths of the cell sides (hexagon, square, etc.). The creased or crimped film 402*a*, 402*b* can continue through another set of nip rollers 406*a*, 406*b* that are configured to heat weld, solvent bond, or mechanically fasten two strips of film 402*a*, 402*b* together at points that are selected to create individual cells having desired shapes. For example, the bonding rollers 406*a*, 406*b* can include pointed tips 408*a*, 408*b* that are heated to a temperature that causes the strips of film 402*a*, 402*b* to melt together. The bonding rollers 406*a*, 406*b* can output a group of assembled film cells 410. A plurality of assembled film cells groups 410 can be created by repeating the process until enough cells are created to form the tessellated structure.

Figure 6:
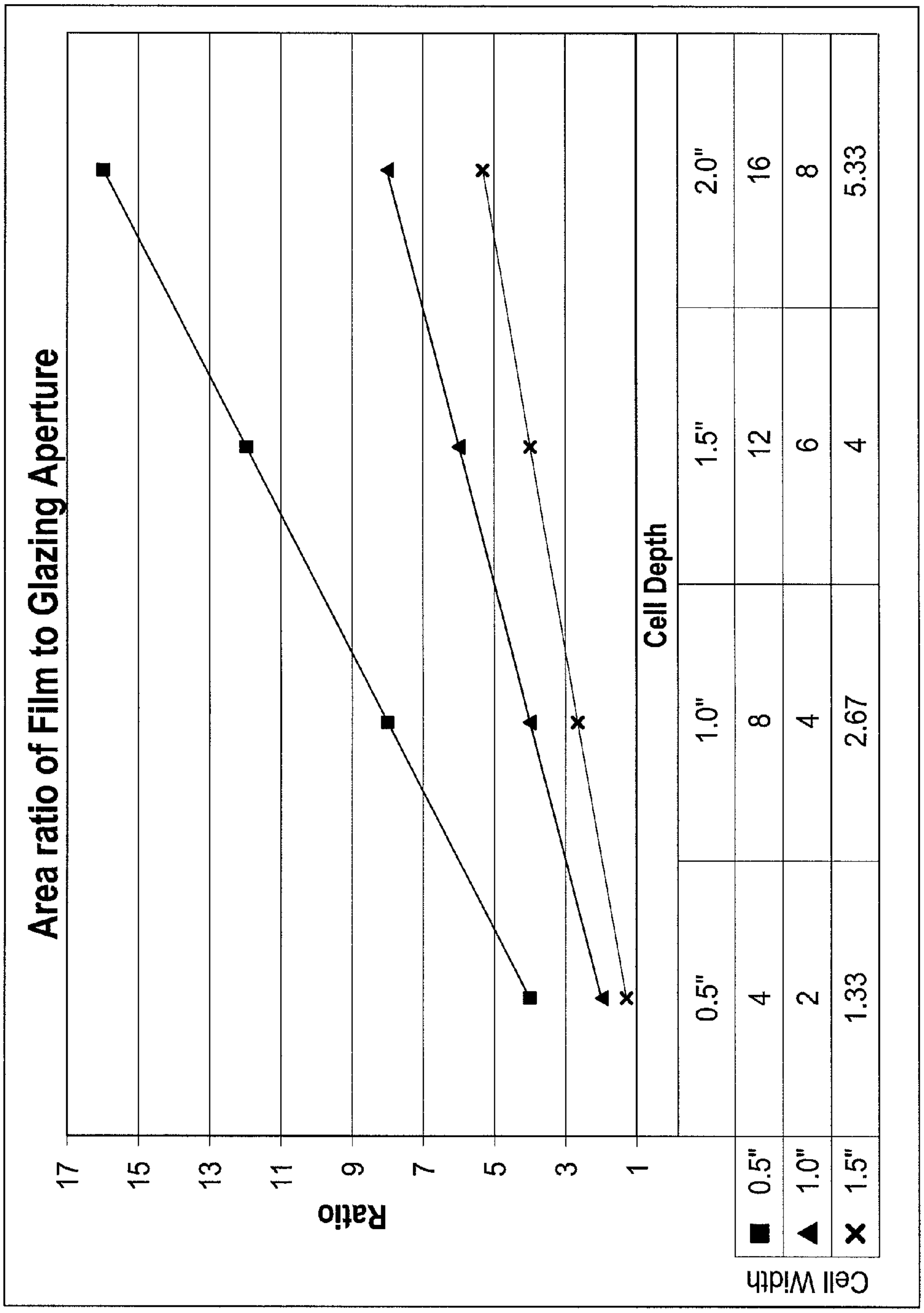
FIG. 6 is an example of a chart showing examples of ratios between the area of film used to form tessellated structure cells and the area of a glazing aperture.

In certain embodiments, a tessellated structure formed using the mandrel process shown in FIGS. 4A-4D is more rigid than the tessellated structure formed using the creased roll process shown in FIG. 5. In some embodiments, the mandrel process uses about twice as much film material to create a tessellated structure as the creased roll process would. The chart shown in FIG. 6 shows a relationship between the area of film used compared the area of a glazing aperture filled by the tessellated structure. Area ratios are provided for example cell configurations having cell widths of 0.5", 1.0", or 1.5" and cell depths of 0.5", 1.0", 1.5", or 2.0". The graph shows ratios of film area to aperture area in an example when a mandrel process as shown in FIGS. 4A-4D is used to prepare the assembled cell structure. In some embodiments, the ratio of the cell depth to the cell width can be at least about 1.0, or larger, such as at least about 1.5 or at least about 2.0. In some embodiments, each of the ratios can be substantially lower, such as when a creased roll process as shown in FIG. 5 is used, resulting in ratio ranges approximately half as large as those provided above.

In some embodiments, a fenestration device with a tessellated structure is incorporated into a tubular daylighting device. A TDD is configured to transport sunlight from the roof of a building to the interior via a tube with a reflective surface on the tube interior. A TDD can sometimes also be referred to as a "tubular skylight." A TDD installation can include a transparent cover installed on the roof of a building or in another suitable location. A tube with a reflective surface on the tube interior extends between the cover and a diffuser installed at the base of the tube. The transparent cover can be dome-shaped or can have another suitable shape and can be configured to capture sunlight. In certain embodiments, the cover keeps environmental moisture and other material from entering the tube. The diffuser spreads light from the tube into the room or area in which the diffuser is situated.

The cover can allow exterior light, such as daylight, to enter the tube. In some embodiments, the cover includes a light collection system configured to enhance or increase the daylight entering the tube. In certain embodiments, a TDD includes a light mixing system. For example, the light mixing system can be positioned in the tube or integrated with the tube and can be configured to transfer light in the direction of the diffuser. The diffuser can be configured to distribute or disperse the light generally throughout a room or area inside the building. Various diffuser designs are possible. A n auxiliary lighting system can be installed in a TDD to provide light from the tube to the targeted area when daylight is not available in sufficient quantity to provide a desired level of interior lighting.

The direction of light reflecting through the tube can be affected by various light propagation factors. Light propagation factors include the angle at which the light enters the TDD, which can sometimes be called the "entrance angle." The entrance angle can be affected by, among other things, the solar elevation, optics in the transparent cover, and the angle of the cover with respect to the ground. Other light propagation factors include the slope of one or more portions of a tube sidewall and the specularity of the sidewall's internal reflective surface. The large number of possible combinations of light propagation factors throughout a single day can result in light exiting the TDD at a wide and continuously varying range of angles.

Figure 7:
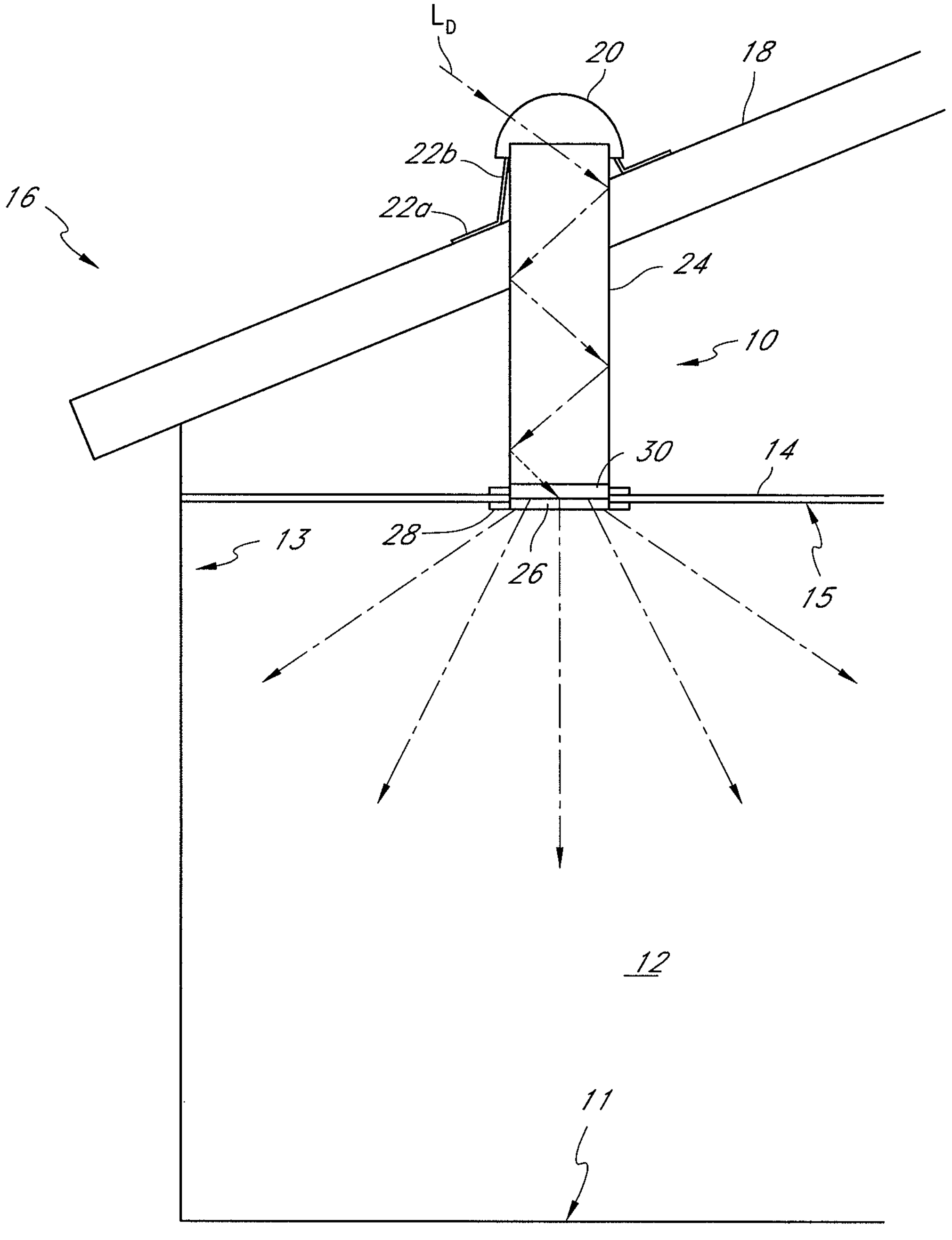
FIG. 7 is a schematic diagram of an example TDD installation incorporating a thermally insulating fenestration device.

FIG. 7 shows a cutaway view of an example of a TDD 10 installed in a building 16 for illuminating, with natural light, an interior room 12 of the building 16. The TDD 10 includes a transparent cover 20 mounted on a roof 18 of the building 16 that allows natural light to enter a tube 24. The cover 20 can be mounted to the roof 18 using a flashing. The flashing can include a flange 22*a* that is attached to the roof 18, and a curb 22*b* that rises upwardly from the flange 22*a* and is angled as appropriate for the cant of the roof 18 to engage and hold the cover 20 in a generally vertically upright orientation. Other orientations are also possible.

The tube 24 can be connected to the flashing 22 and can extend from the roof 18 through a ceiling 15 of the interior room 12. The tube 24 can direct light $L_D$ that enters the tube 24 downwardly to a light diffuser 26, which disperses the light in the room 12. The interior surface 25 of the tube 24 can be reflective. In some embodiments, the tube 24 has at least a section with substantially parallel sidewalls (e.g., a generally cylindrical surface). As illustrated, the tube 24 can include multiple angular sections connected in a manner that forms angles between adjacent sections. Many other tube shapes and configurations are possible. The tube 24 can be made of metal, fiber, plastic, a rigid material, an alloy, another appropriate material, or a combination of materials. For example, the body the tube 24 can be constructed from type 1150 alloy aluminum. The shape, position, configuration, and materials of the tube 24 can be selected to increase or maximize the portion of daylight $L_D$ or other types of light entering the tube 24 that propagates into the room 12.

The tube 24 can terminate at or be functionally coupled to a light diffuser 26. The light diffuser 26 can include one or more devices that spread out or scatter light in a suitable manner across a larger area than would result without the diffuser 26 or devices thereof. In some embodiments, the diffuser 26 permits most or substantially all visible light traveling down the tube 24 to propagate into the room 12. The diffuser can include one or more lenses, ground glass, holographic diffusers, other diffusive materials, or a combination of materials. The diffuser 26 can be connected to the tube 24 using any suitable connection technique. For example, a seal ring 28 can be surroundingly engaged with the tube 24 and connected to the light diffuser 26 in order to hold the diffuser 26 onto the end of the tube 24. In some embodiments, the diffuser 26 is located in the same general plane as the ceiling 15, generally parallel to the plane of the ceiling, or near the plane of the ceiling 15.

In certain embodiments, the diameter of the diffuser 26 is substantially equal to the diameter of the tube 24, slightly greater than the diameter of the tube 24, slightly less than the diameter of the tube 24, or substantially greater than the diameter of the tube 24. The diffuser 26 can distribute light incident on the diffuser toward a lower surface (e.g., the floor 11) below the diffuser and, in some room configurations, toward an upper surface (e.g., at least one wall 13 or ceiling 15) of the room 12. The diffuser 26 can spread the light such that, for example, light from a diffuser area of at least about 1 square foot and/or less than or equal to about 4 square feet can be distributed over a floor and/or wall area of at least about 60 square feet and/or less than or equal to about 200 square feet in a typical room configuration.

In the embodiment shown in FIG. 7, the TDD 10 includes a fenestration device 30 configured to reduce a rate of thermal energy transfer between the interior of the TDD 10 and the room 12. In the illustrated embodiment, the fenestration device 30 is disposed adjacent to the diffuser 26, between the diffuser 26 and the interior of the tube 24. The fenestration device 30 can be disposed at any other suitable position, such as near the top of the tube 24, near the level of the roof 18, near the level of the ceiling 15, or near the level of the dome 20. In some embodiments, the fenestration device 30 can be positioned at the same level as an insulation layer found in the building. For example, in a building with an insulation layer 14 directly above the ceiling 15, the fenestration device 30 can be positioned at or near the level of the insulation layer 14 in order to provide a substantially contiguous layer of insulation. The TDD 10 can also have fenestration devices disposed at a combination of positions. The position(s) of the fenestration device(s) 30 can be selected to produce any desired thermal energy transfer characteristics.

Figure 8:
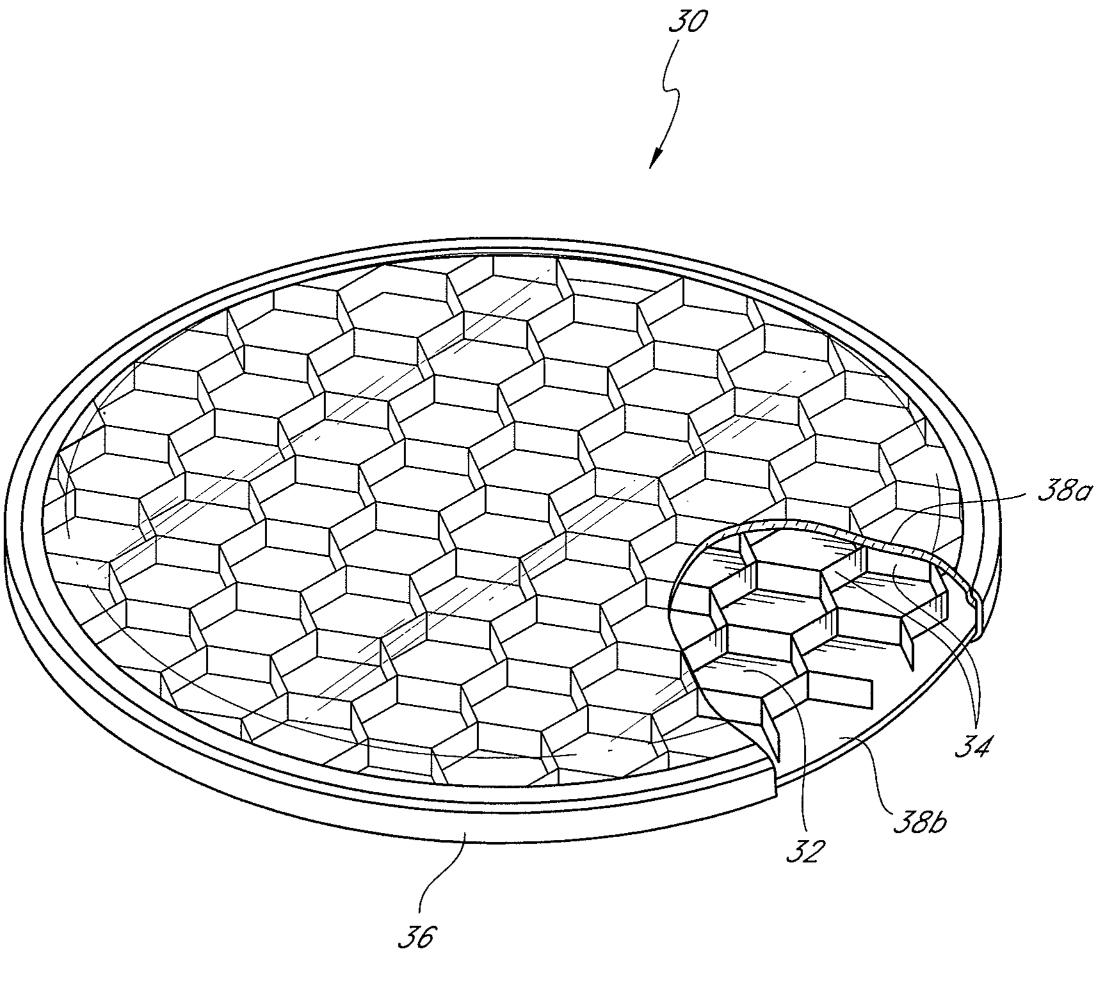
FIG. 8 is a perspective view of a thermally insulating fenestration device.

The fenestration device 30 can have a tessellated structure, as shown in FIG. 8. The illustrated tessellated structure includes hexagonally-shaped cells 32 with reflective sidewalls 34. A ring 36 surrounding the tessellated structure can allow the fenestration device 30 to be secured within the tube 24 of a TDD 10, at an end of the tube 24, or within another type of fenestration aperture. The fenestration device 30 can have an integral glazing pane **38*b* disposed on one side of the tessellated structure or glazing panes 38*a*, 38*b* on both sides of the tessellated structure. In certain embodiments, a fenestration device 30 with only a single glazing pane 38*b* is configured to be installed in an opening such that the side without a pane is adjacent to a substantially flat transparent surface, such as a diffuser. In other embodiments, the fenestration device 30** has no integrated glazing pane but is configured to be placed in the space between panes of a multiple pane glazing unit.

Figure 9:
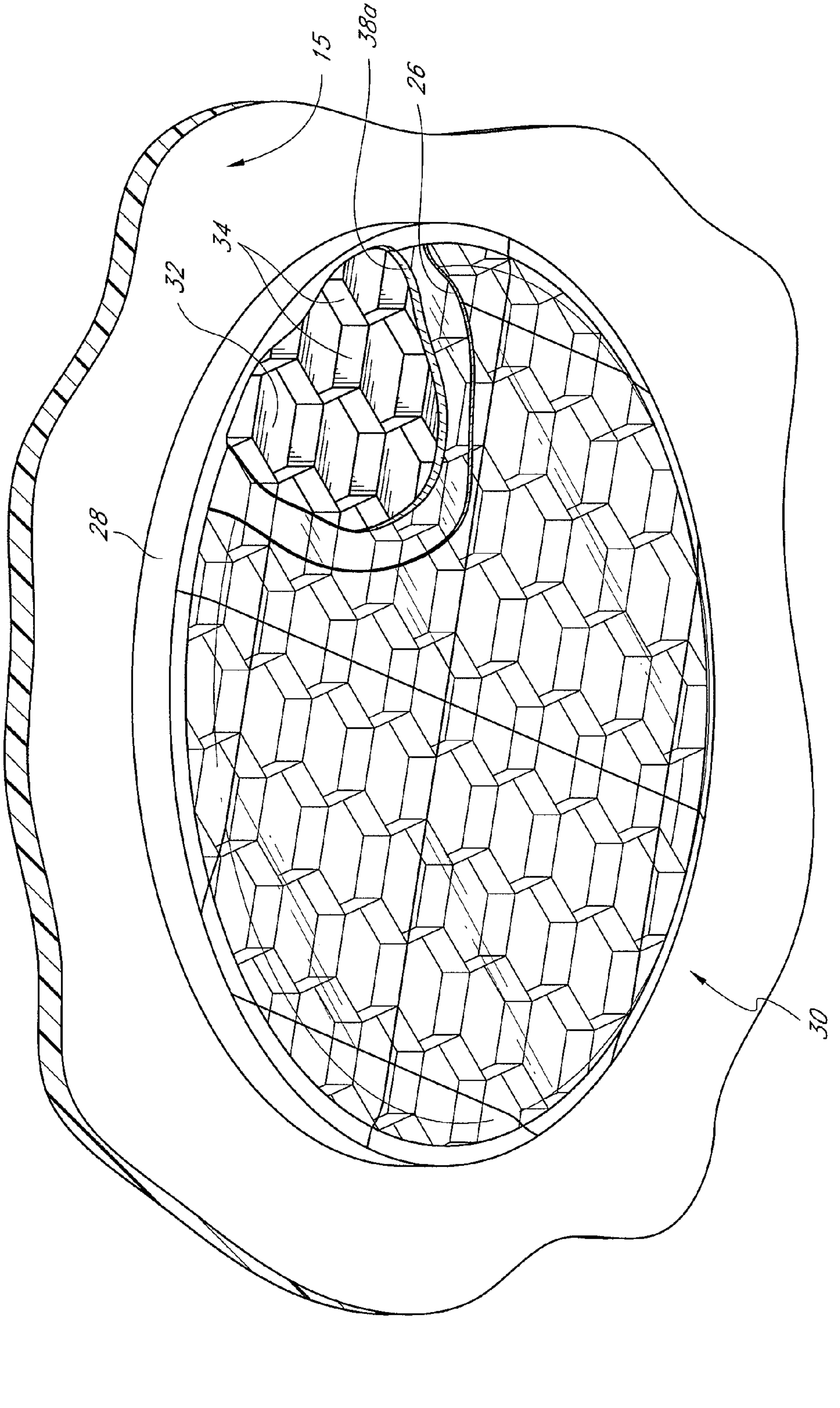
FIG. 9 is a partial perspective view of an example TDD installation incorporating the thermally insulating fenestration device shown in FIG. 8.

In the embodiment illustrated in FIG. 9, the fenestration device 30 shown in FIG. 8 is installed in a TDD 10 directly above a diffuser 26. The illustrated diffuser 26 includes a plurality of lens elements that can at least partially affect the appearance of the fenestration device 30 when viewed from the standpoint of an observer in the room. The diffuser 26 can be configured to refract or reflect light propagating through the diffuser in a manner that alters or obscures the view of the fenestration device 30. In this manner, the diffuser 26 can be used to improve the aesthetic appearance of the fenestration device 30. In some embodiments, the fenestration device 30 is oriented horizontally when it is installed in an opening of the building envelope.

Discussion of the various embodiments disclosed herein has generally followed the embodiments illustrated in the figures. However, it is contemplated that the particular features, structures, or characteristics of any embodiments discussed herein may be combined in any suitable manner in one or more separate embodiments not expressly illustrated or described. For example, it is understood that a fenestration device can include no glazing pane, one glazing pane, or more than one glazing pane. A fenestration device can also include optical elements, reflective surfaces, diffusive surfaces, absorptive surfaces, refractive surfaces, and other features in addition to the features disclosed herein. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the tessellated structures disclosed herein may be used in at least some daylighting systems, fenestration devices, and/or other lighting installations besides TDDs.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

The following is claimed:

1. A fenestration apparatus comprising:

first and second glazing panes capable of being installed in an opening of a building envelope;

a tessellated structure disposed between the first and second glazing panes, the tessellated structure comprising:

at least one partition having a first face and a second face, the at least one partition defining a plurality of spatially separated cells within a substantially contiguous region of the opening, each of the plurality of spatially separated cells having a cell width, a cell area, and a cell depth, wherein the at least one partition has a thickness that is less than or equal to 0.01 inches;

wherein the at least one partition comprises reflective film;

wherein the tessellated structure comprises a honeycomb structure;

wherein each of the plurality of spatially separated cells is at least partially surrounded by at least one face of the at least one partition, wherein the luminous reflectance of the first face of the at least one partition is greater than or equal to about 95% when measured with respect to CIE illuminant $D_{65}$, wherein the fenestration apparatus has a visible light transfer efficiency greater than or equal to 85% when measured with respect to light entering the fenestration apparatus at an incident angle of 75°, and wherein a U-factor of the fenestration apparatus is reduced by at least 25% when compared to a fenestration device having a same configuration but no tessellated structure.

2. The apparatus of claim 1, wherein the building envelope comprises a roof, and wherein the opening comprises an internally reflective tube extending between an aperture in the roof and a location inside of a building.

3. The apparatus of claim 1, wherein the reflective film of the at least one partition comprises a plurality of reflective film segments.

4. The apparatus of claim 1, wherein the fenestration apparatus is positioned such that exterior light passes through the second glazing pane after passing through the tessellated structure, and wherein a fraction of visible light exiting the second glazing pane is greater than or equal to about 85% of the visible light entering the fenestration apparatus.

5. The apparatus of claim 1, wherein the honeycomb structure of the tessellated structure comprises a cubic prismatic honeycomb structure or a hexagonal prismatic honeycomb structure.

6. The apparatus of claim 1, wherein the luminous reflectance of the second face of the at least one partition is greater than or equal to about 95% when measured with respect to CIE illuminant $D_{65}$.

7. The apparatus of claim 2, wherein the luminous reflectance of each of the first face and the second face of the at least one partition is greater than or equal to about 99% when measured with respect to CIE illuminant $D_{65}$.

8. The apparatus of claim 1, wherein the luminous reflectance of the first face of the at least one partition is greater than or equal to about 99% when measured with respect to CIE illuminant $D_{65}$.

9. The apparatus of claim 1, wherein the cell depth of each of the plurality of spatially separated cells is greater than or equal to about 0.5 inches.

10. The apparatus of claim 1, wherein the cell width of each of the plurality of spatially separated cells is less than or equal to about 2 inches.

11. The apparatus of claim 1, wherein a ratio of the cell depth to the cell area of the plurality of spatially separated cells is at least 2.0.

12. The apparatus of claim 1, wherein the at least one partition has a thermal conductivity that is less than or equal to about 1.5 BTU/Hr-Ft$^2$-°F/inch.

* * * * *

UNITED STATES PATENT AND TRADEMARK OFFICE

CERTIFICATE OF CORRECTION

PATENT NO. : 8,601,757 B2
APPLICATION NO. : 12/789367
DATED : December 10, 2013
INVENTOR(S) : Jaster et al.

It is certified that error appears in the above-identified patent and that said Letters Patent is hereby corrected as shown below:

On the Title Page

In column 2 (page 3, item 56) at line 39, Under Other Publications, change “frome” to --from--.

In the Specification

In column 2 at line 7, Change “apparatus” to --apparatus.--.

In column 7 at line 39, Change “.5/25” to --.5/.25--.

In column 9 at line 49, Change “inches)),” to --inches),--.

In column 11 at line 45, Change “A n” to --An--.

In the Claims

In column 14 at line 57, In Claim 7, change “claim 2” to --claim 6,--.

Signed and Sealed this
First Day of July, 2014

Michelle K. Lee

Michelle K. Lee
*Deputy Director of the United States Patent and Trademark Office*